(12) United States Patent  
Yang et al.

(10) Patent No.: US 9,794,382 B2  
(45) Date of Patent: Oct. 17, 2017

(54) MOBILE TERMINAL

(71) Applicant: LG ELECTRONICS INC., Seoul (KR)

(72) Inventors: Hyunsuk Yang, Seoul (KR); Jaichul Kim, Seoul (KR); Taewha Choi, Seoul (KR); Jongmo Kang, Seoul (KR); Jinho Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/047,216

(22) Filed: Feb. 18, 2016

(65) Prior Publication Data  
US 2017/0006143 A1 Jan. 5, 2017

(30) Foreign Application Priority Data

Jul. 3, 2015 (KR) .................. 10-2015-0095392

(51) Int. Cl.  
*H04M 1/02* (2006.01)  
*G06F 1/16* (2006.01)  
(Continued)

(52) U.S. Cl.  
CPC .......... *H04M 1/0249* (2013.01); *G06F 1/165* (2013.01); *G06F 1/1626* (2013.01); *G06F 1/1647* (2013.01); *G06F 1/1656* (2013.01); *G06F 1/1671* (2013.01); *G06F 1/1686* (2013.01); *G06F 1/1688* (2013.01); *G06F 1/1698* (2013.01); *H01Q 1/243* (2013.01);  
(Continued)

(58) Field of Classification Search  
CPC .. G06F 1/1652; G06F 1/1601; H04M 1/0266; H04M 1/0283; H04M 1/22; G09G 2354/00  
See application file for complete search history.

(56) References Cited

U.S. PATENT DOCUMENTS 9,513,668 B2 * 12/2016 Shin ..................... G06F 3/041  
2006/0132695 A1 * 6/2006 Mizuno ................ G02F 1/1333  
349/150  
(Continued)

FOREIGN PATENT DOCUMENTS

CN 204216211 U 3/2015  
DE 202012002323 U1 5/2012  
(Continued)

*Primary Examiner* — Bobbak Safaipour  
(74) *Attorney, Agent, or Firm* — Birch, Stewart, Kolasch & Birch, LLP

(57) ABSTRACT

A mobile terminal includes: a main body with a top surface, a bottom surface, and a back surface; and a case surrounding the main body, the case including: a top side portion covering the top surface of the main body; a backside portion including a first backside portion positioned in the upper part and covering the back of the main body and a second backside portion positioned below the first backside portion and covering the back of the main body; and a bottom side portion covering the bottom surface of the main body, wherein the top side portion, first backside portion, second backside portion, and bottom side portion may be made of a metal material, and separated from one another by a non-metal member, and the non-metal member may have a light-emitting portion that gives off light.

18 Claims, 15 Drawing Sheets

(51) Int. Cl.
*H01Q 1/24* (2006.01)
*H04M 1/22* (2006.01)
*H04W 88/02* (2009.01)

(52) U.S. Cl.
CPC ......... *H04M 1/0202* (2013.01); *H04M 1/026* (2013.01); *H04M 1/0266* (2013.01); *H04M 1/0268* (2013.01); *H04M 1/0283* (2013.01); *H04M 1/22* (2013.01); *H04M 2250/06* (2013.01); *H04M 2250/10* (2013.01); *H04M 2250/16* (2013.01); *H04W 88/02* (2013.01)

(56) References Cited

U.S. PATENT DOCUMENTS

| | | | |
|---|---|---|---|
| 2007/0052906 A1* | 3/2007 | Sueyoshi | G02F 1/133512 349/151 |
| 2011/0165916 A1* | 7/2011 | Park | H01Q 1/06 455/566 |
| 2013/0017865 A1 | 1/2013 | Allore et al. | |
| 2014/0125528 A1* | 5/2014 | Tsai | H01Q 13/106 343/702 |
| 2016/0134010 A1 | 5/2016 | Yan | |

FOREIGN PATENT DOCUMENTS

| | | | |
|---|---|---|---|
| EP | 2341698 | A1 | 7/2011 |
| EP | 2781987 | A1 | 9/2014 |
| GB | 2517770 | A | 3/2015 |

* cited by examiner

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2015-0095392, filed on Jul. 3, 2015 the contents of which is incorporated by reference herein in its entirety.

BACKGROUND OF THE INVENTION

1. Field of the Invention

The present invention relates to a mobile terminal which can provide a user with information in various ways by dividing its back case.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, some mobile terminals come with their backside divided into a plurality of sections. This is to get a frequency band for an antenna since the back case is used as the antenna.

Regarding this, the use of the back case of a mobile terminal as an antenna was conventionally proposed. FIGS. 13 and 14 are illustrations of the use of the back case of a conventional mobile terminal 50 and 90 as an antenna.

First, referring to FIG. 13, on the backside of the mobile terminal 50, a first section 10 and a second section 20 are electrically separated by a first non-conductive member 41, and the second section 20 and a third section 30 are separated by a second non-conductive member 42. In this instance, the first section 10 and the third section 30 are used as antenna radiators.

FIG. 14 illustrates insulative members 65a and 66a formed as far as the side of the mobile terminal 90 whose back case is made of metal to be used as an antenna. That is, the back case is divided into an upper case 60, a lower case 70, and a middle case 70 by the first and second insulative members 65 and 66. Besides, part of a side frame 85 is made of a metal material, at least one gap 65a and 66a is provided on the side frame 85, and the gaps 65a and 66a are filled with an insulating material.

Though there has been the conventional technology that uses the back case as part of an antenna, the part by which the back case is divided and separated has been merely used to separate a metal member (back case).

Therefore, space generated by dividing the back case cannot be used, so there is a need to use the space.

SUMMARY OF THE INVENTION

The present invention has been made in an effort to solve the aforementioned problems, and an aspect of the present invention is to provide a mobile terminal which provides a user with various information by using part of the back case divided into a plurality of sections.

To achieve the above or other objects, according to one aspect of the present invention, there is provided a mobile terminal including: a main body having a top surface, a bottom surface, and a back surface; and a case surrounding the main body, the case including: a top portion covering the top surface of the main body; a first back portion positioned at an upper part of the back surface and covering at least a first portion of the back surface; a second back portion positioned below the first back portion and covering at least a second portion of the back surface; and a bottom side portion covering the bottom surface of the main body, wherein the top portion, first back portion, second back portion, and bottom side portion may be made of a metal material, wherein the top portion, first back portion, second back portion, and bottom side portion may be separated from one another by a non-metal member, and wherein the non-metal member may have a light-emitting portion that gives off light.

According to one aspect of the present invention, the non-metal member may include: a first non-metal member that separates the top portion and the first back portion; a second non-metal member that separates the first back portion and the second back portion; and a third non-metal member that separates the second back portion and the bottom side portion.

According to one aspect of the present invention, the light-emitting portion may include: a translucent portion; and a light source provided below the translucent portion.

According to one aspect of the present invention, the light-emitting portion may further include a light guide portion provided below the translucent portion and made of a transparent material that transmits light from the light source.

According to one aspect of the present invention, grooves may be formed at regular intervals on a bottom surface of the light guide portion, and a variety of patterns may be formed by the spacing between the grooves.

According to one aspect of the present invention, the light-emitting portion may be a sub-display portion that displays information, the sub-display portion including: a rear window; a rear display; and a support member that fixes the rear window and the rear display to the main body.

According to one aspect of the present invention, the sub-display portion may be curved to correspond to a shape of the mobile terminal.

According to one aspect of the present invention, light shielding tape may be provided between the rear display and the main body.

According to one aspect of the present invention, opposite ends of the translucent portion may be curved toward a front of the mobile terminal from a back of the mobile terminal to provide a curved part, the translucent portion including a pair of hook portions formed on an inside of the curved part, the pair of hook portions extending towards each other, and wherein a front display may be seated on the pair of hooks.

According to one aspect of the present invention, the translucent portion may include bonding portions arranged between the pair of hook portions, and wherein the bonding portions may protrude toward the main body such that the second non-metal member may be fixed to the main body.

According to one aspect of the present invention, the top portion, first back portion, and bottom side portion may be connected to a printed circuit board such that the top portion may provide a first antenna radiator, the first back portion may provide a second antenna radiator, and the bottom side portion may provide a third antenna radiator, and wherein the second back portion may be electrically connected to the printed circuit board to provide a ground portion.

According to one aspect of the present invention, the mobile terminal may further include first and second flexible circuit boards connected to the printed circuit board and spaced apart from each other, the first and second flexible circuit boards being provided near the top surface of the main body, wherein the first and second flexible circuit boards may include respective first and second feed connecting portions electrically connected to the top portion to feed the top portion.

According to one aspect of the present invention, the mobile terminal may further include third feed connecting portions on the printed circuit board at the upper part of the back surface, the third feed connecting portions, which are electrically connected to the first back portion to feed the first back portion.

According to one aspect of the present invention, the mobile terminal may further include: a fourth feed connecting portion on the printed circuit board on one side of the bottom surface of the main body; a fourth carrier connected to the fourth feed connecting portion and having a metal pattern; and a fourth contact terminal formed at the fourth carrier and contacting the bottom side portion.

According to one aspect of the present invention, the mobile terminal may further include: a fifth feed connecting portion on the printed circuit board provided on another side of the bottom surface of the main body; a fifth carrier connected to the fifth feed connecting portion and having a metal pattern; and a fifth contact terminal formed at the fifth carrier and contacting the bottom side portion.

According to one aspect of the present invention, the fourth carrier and the fifth carrier each may include an audio input portion.

According to one aspect of the present invention, the first non-metal member may define a slit between the first antenna radiator and the second antenna radiator, wherein the second non-metal member may define a slit between the second antenna radiator and the ground, and wherein the third non-metal member may define a slit between the ground and the third antenna radiator.

According to one aspect of the present invention, a thickness of the mobile terminal at the first back portion may be larger than a thickness of the mobile terminal at the second back portion.

According to one aspect of the present invention, the light-emitting portion may be configured to provide an indicator representative of at least one of a message reception, a call signal reception, a missed call, an alarm, a schedule reminder, data received from an application, or text/multimedia message transmission and reception.

According to one aspect of the present invention, the main body may further include a front surface and a front display at the front surface, the back surface, which are opposite the front surface.

The advantages of the mobile terminal and control method thereof according to the present invention will be described below.

According to at least one exemplary embodiment of the present invention, the back case of the mobile terminal can be divided into multiple sections, and the spacing between the sections of the back case can be used as a light-emitting portion.

According to at least one exemplary embodiment of the present invention, the sections of the back case can work as antennas since the back case of the mobile terminal is made of a metal material.

According to at least one exemplary embodiment of the present invention, the user can be provided with various information through a rear display by dividing the back case of the mobile terminal by non-metal members and implementing the non-metal members as the rear display.

Further scope and applicability will be apparent from the detailed description given hereinafter. It should be understood however, that this detailed description, while indicating preferred embodiments of the present invention, is given by way of illustration only, since various changes and modification within the spirit and scope of the invention will become apparent to those skilled in the art.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
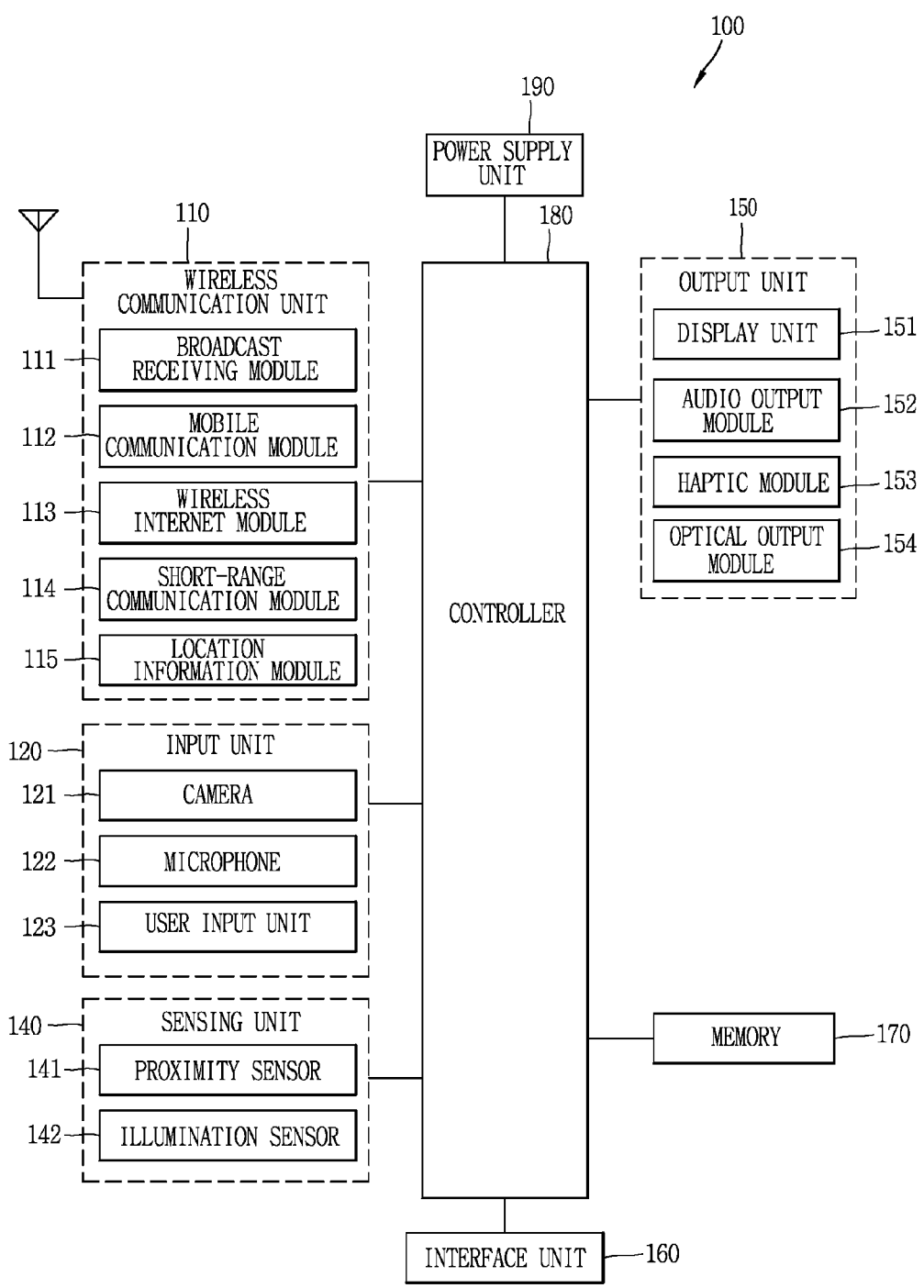
FIG. 1A is a block diagram illustrating a mobile terminal according to an exemplary embodiment.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
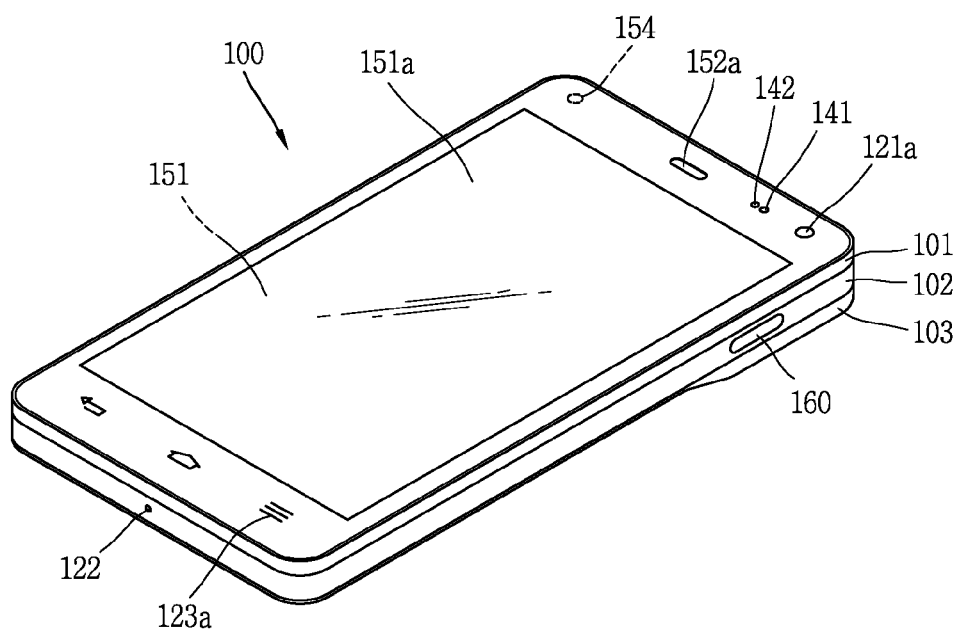
FIG. 1B is a front view of a mobile terminal related to an exemplary embodiment of the present invention.
Figure 1C:
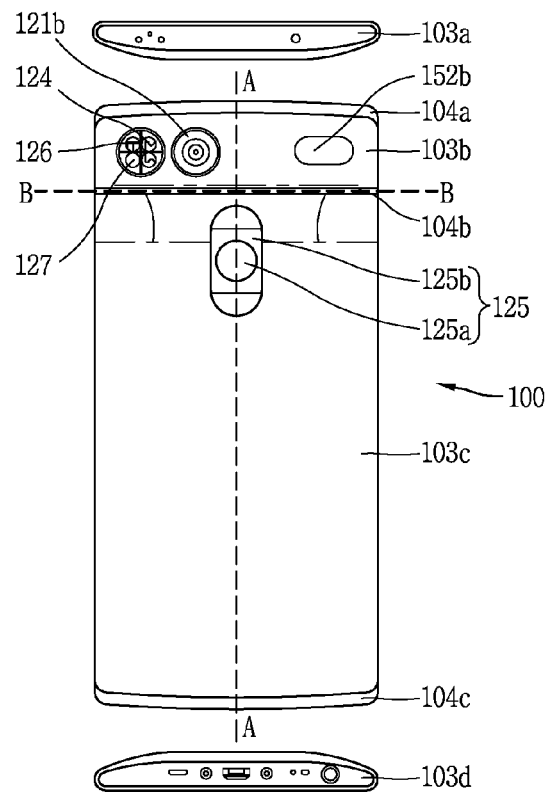
FIG. 1C is a rear view of a mobile terminal related to an exemplary embodiment of the present invention.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments related to a mobile terminal 100 thus configured will be described with reference to the accompanying drawings. It will be apparent to those skilled in the art that the present invention can be embodied in other specific forms without departing from the spirit and essential characteristics of the invention.

FIG. 1C is a rear view of a mobile terminal 100 related to an exemplary embodiment of the present invention. Referring to FIG. 1C, the mobile terminal 100 according to an exemplary embodiment of the present invention will be described.

The outer appearance of the mobile terminal according to an exemplary embodiment of the present invention is formed by using a metal member and a non-metal member for part of an outermost case 103. At least part of the metal member works as an antenna. That is, the mobile terminal 100 according to an exemplary embodiment of the present invention includes a main body with a top surface, a bottom surface, and a back surface, and a case 103 surrounding the main body.

Although the case 103 may be divided into a front case 101, a rear case 102, and a back cover 103 as shown in FIG. 1B, the following description will focus on a case where the rear case 102 and the back case 103 are integrally formed. However, it does not exclude a case where the rear case 102 and the back case 103 are separated from each other as shown in FIG. 1B.

Referring to FIG. 1C, the case 103 includes a top side portion 103a covering the top of the main body, a backside portion including a first backside portion 103b positioned in the upper part and covering the back of the main body and a second backside portion 103c positioned below the first backside portion 103b and covering the back of the main body, and a bottom side portion 103d covering the bottom of the main body. The top side portion is a side positioned on the top between the front and back sides of the mobile terminal 100, and the bottom side portion is a side positioned on the bottom between the front and back sides of the mobile terminal 100.

As the other sides provided between the front and back sides of the mobile terminal 100, apart from the top and bottom, are part of the first and second backside portions 103b and 103c, they will be described as included in the first and second backside portions 103b and 103c.

Moreover, the backside may be divided into at least two sections. If the backside is divided to have two metal members, it may be referred to as the first and second backside portions 103b and 103c. The top side portion 103a, first backside portion 103b, second backside portion 103c, and bottom side portion 103d are made of a metal material, and separated from one another by non-metal members. The non-metal members may be decoration members, and made of plastic.

The top side portion 103a, first backside portion 103b, and bottom side portion 103d work as antenna radiators, as will be described below, and the second backside portion 103c works as a ground portion. To this end, the top side portion 103a, first backside portion 103b, and bottom side portion 103d are connected to a printed circuit board 181 (see FIG. 6), and the second backside portion 103c may be electrically connected to the printed circuit board 181 to work as the ground portion. In this way, the top side portion 103a, first backside portion 103b, second backside portion 103c, and bottom side portion 103d are all metal members, and electrically connected to the printed circuit board 181.

In this instance, the first backside portions 103a may be referred to as a top metal, the bottom side portion 103d may be referred to as a rear metal, and the second backside portion 103c may be referred to as a body metal. The top side portion 103a, first and second backside portions 103b and 103c, and bottom side portion 103d may be formed into a case 103 by insert molding and/or NC (numerical control) machining.

Hereinafter, an antenna using the top side portion 103a may be referred to as an upper antenna device, an antenna using the bottom side portion 103d may be referred to as a lower antenna device, and an antenna using the first backside portion 103b may be referred to as a rear antenna device. Alternatively, the rear antenna device may be formed using the second backside portion 103c. In this case, the first backside portion 103b needs to serve as the ground portion.

Although FIG. 1C depicts that the top side portion 103a and the bottom side portion 103d are not formed on the back of the mobile terminal 100, the present invention is not necessarily limited thereto, and part of the top side portion 103a and bottom side portion 103d may extend to at least part of the back of the mobile terminal 100. FIG. 1C depicts that the first backside portion 103b is formed in part of the upper part of the mobile terminal 100 and the second backside portion 103c occupies most of the back of the mobile terminal 100. However, the present invention is not limited thereto, and it will be apparent that the areas occupied by the first and second backside portions 103b and 103c may be increased or decreased as required. Also, although a rear input portion 125 is illustrated as being formed in the upper part of the second backside portion 103c, the rear input portion 125 may be formed either only in the first backside portion 103b, or across the first and second backside portions 103b and 103c, or only in the second backside portion 103c.

In a first exemplary embodiment of the present invention, the rear input portion 125 is provided which includes a first button portion 125a for pushing a first function and a second button portion 125b for pushing a second function. The first function may be a function associated with power on/off or enabling a display portion, and the second function may be a function associated with adjusting the volume of sound from the main body of the terminal or a function for scrolling information shown on the display portion. The first button portion 125a is positioned midway along the second button portion 125b.

Figure 12A:
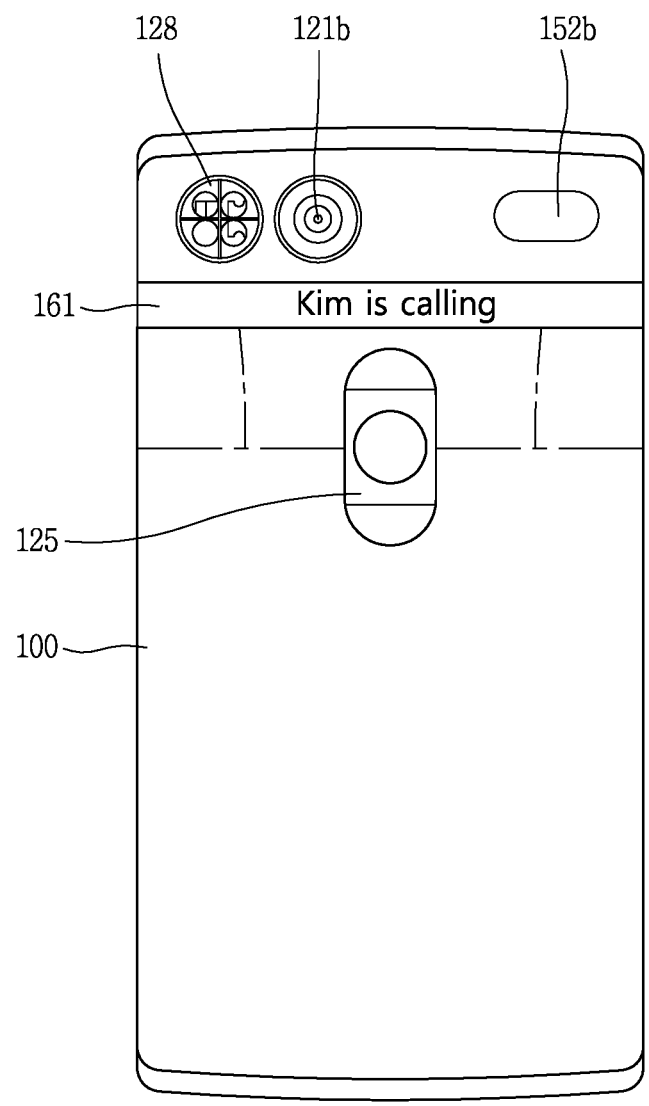
FIGS. 12A to 12C are views for explaining a light-emitting portion, i.e., sub-display, according to an exemplary embodiment of the present invention.
Figure 12B:
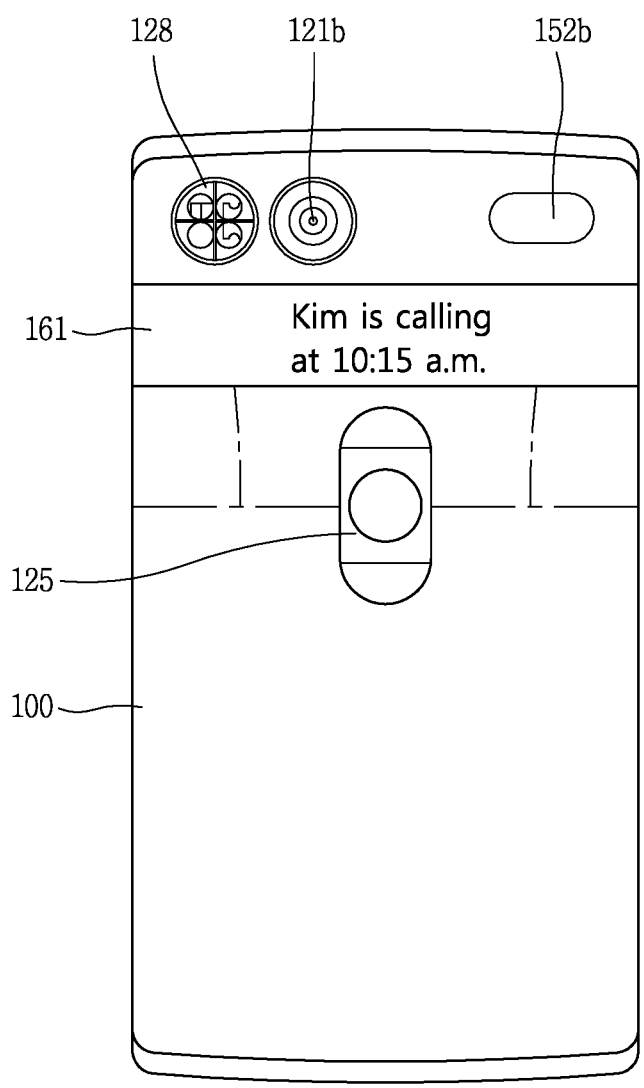
Figure 12C:
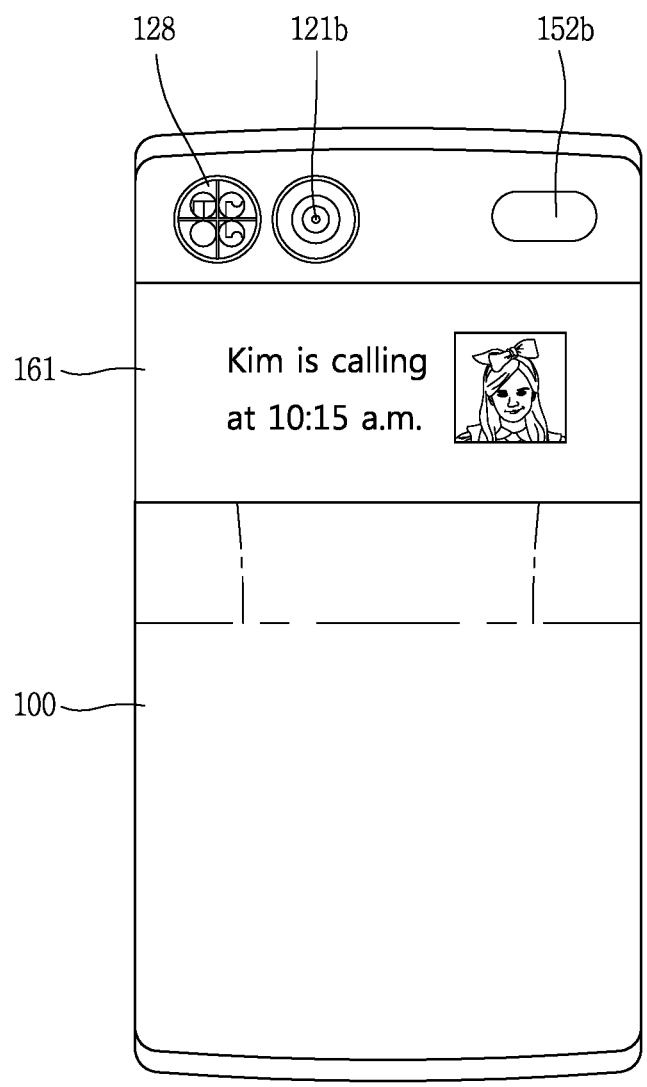
Figure 13:
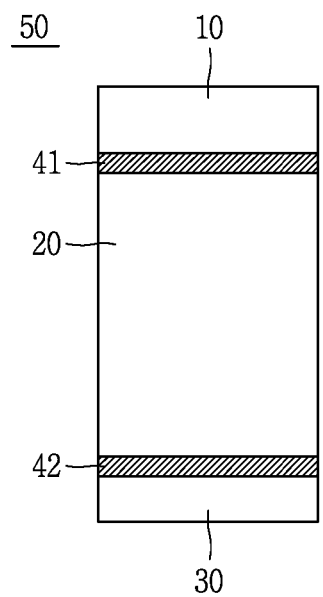
FIGS. 13 and 14 are illustrations of the use of the back case of a conventional mobile terminal as an antenna.
Figure 14:
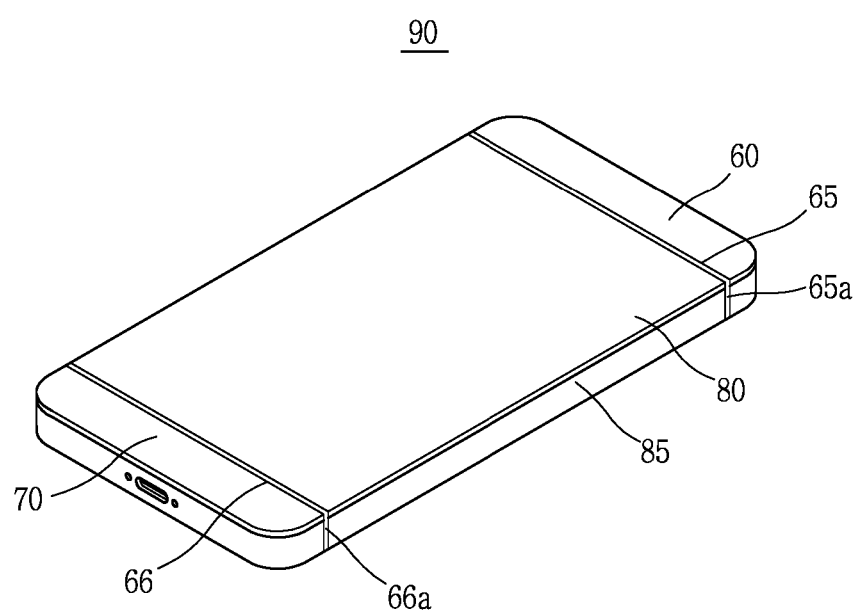

Meanwhile, the rear input portion may be omitted as shown in FIG. 12C.

Figure 2:
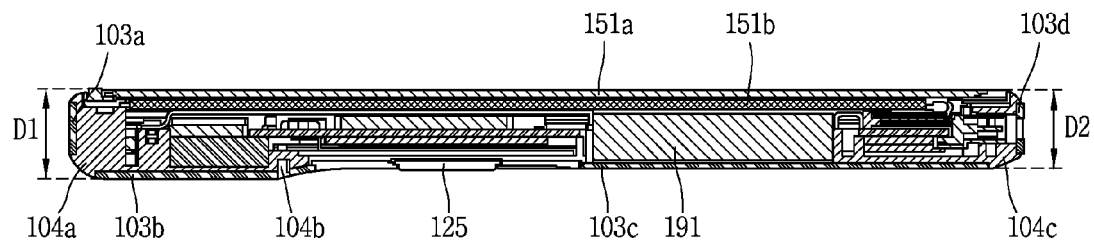
FIG. 2 is a cross-sectional view taken along line AA of FIG. 1C.

FIG. 2 is a cross-sectional view taken along line AA of FIG. 1C. Referring to FIG. 2, it can be seen that the thickness of the mobile terminal 100 differs along the length. The thickness D1 of the part where the first backside portion 103b resides is larger than the thickness D2 of the part where the second backside portion 103c resides. This is to prevent a large number of parts such as a rear camera 121b, a sensor portion 128, etc., mounted where the first backside portion 103b would be, from protruding out if these parts are thick.

For example, recently, some rear cameras 121b mounted on mobile terminals 100 use thicker camera modules in order to take high-resolution photos. In this instance, the rear camera 121b protrudes rearward. A camera window (not shown) is positioned on the outermost part of the rear camera 121b. If the back of the mobile terminal 100 is placed in contact with the ground of the surface of a structure, the camera window will be scratched. To avoid this, the thickness D1 of the part where the rear camera 121b resides may be larger than the thickness D2 of the other parts, and the thickness of the second backside portion 103c contacting the edge of the first backside portion 103b may change gradually.

Referring again to FIG. 2, it can be seen that the top side portion 103a, first and second backside portions 103b and 103c, and bottom side portion 103d are separated from one another by non-metal members 104a, 104b, and 104c. That is, the non-metal members 104a, 104b, and 104c include a first non-metal member 104a that separates the top side portion 103a and the first backside portion 103b, a second non-metal member 104b that separates the first backside portion 103b and the second backside portion 103c, and a third non-metal member 104c that separates the second backside portion 103c and the bottom side portion 103d.

At least one of the first to third non-metal members 104a, 104b, and 104c has a light-emitting portion that gives off light. An exemplary embodiment of the present invention will be described with an example where the light-emitting portion is formed at the second non-metal member 104b. This does not necessarily mean that the light-emitting portion emits light, but that it transmits various visual information along with light.

In this case, a battery 191 is positioned where the second backside portion 103c is formed.

Figure 9:
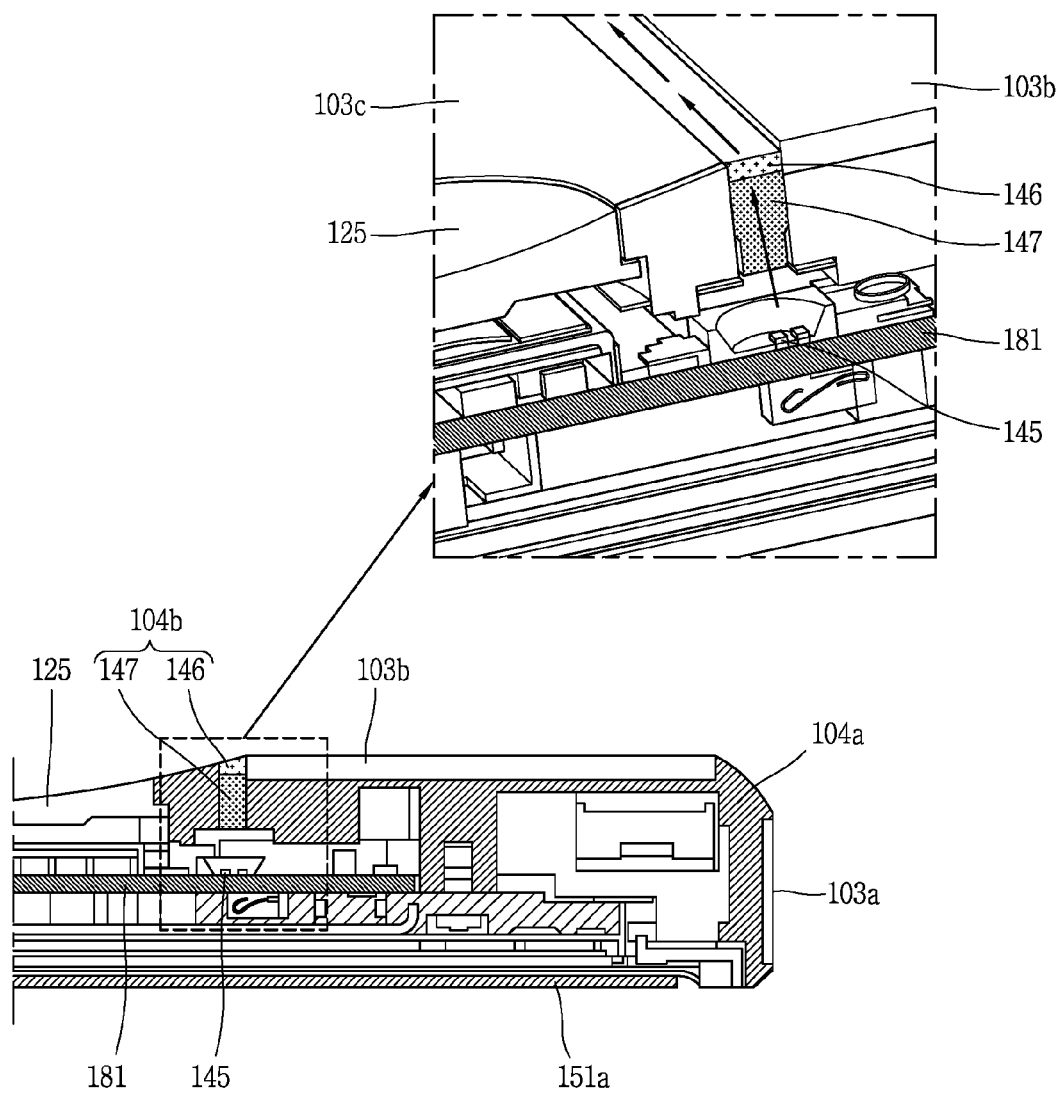
FIG. 9 is a partial cross-sectional view taken along line AA of FIG. 1C and an enlarged perspective view of the cross section.

FIG. 9 is a partial cross-sectional view taken along line AA of FIG. 1C and an enlarged perspective view of the cross section. Referring to FIG. 9, the second non-metal member 104b positioned between the first backside portion 103b and the second backside portion 103c serves as the light-emitting portion. The light-emitting portion includes a translucent portion 146 made of a translucent material that is exposed to the outside, and a light source 145 provided below the translucent portion 146. The translucent portion 146 is made of a translucent material through which light partially passes, for example, a polycarbonate (PC) material. The translucent portion 146 is a portion that is exposed to the outside, and emits light while blocking the inside The light-emitting portion may further include a light guide portion 147 that is provided under the translucent portion 146 and made of a transparent material that transmits light from the light source 145. The light guide portion 147 functions to receive light from the light source 145 and diffuses it to the outside. For example, the light guide portion 147 may be a light guide plate (LGP) or a light guide film (LGF). Although the translucent portion 146 is illustrated as thinner than the light guide portion 147, the present invention is not necessarily limited thereto. The light guide portion 147 may be made thinner than the translucent portion 146 especially in a case where it is made of a light guide film.

The light source 145 may be an LED, for example, an RGB LED.

Although FIG. 9 depicts that the light source 145 is positioned below the translucent portion 146 and the light guide portion 147, the present invention is not necessarily limited thereto. For example, the light source 145 may be positioned on the side of the translucent portion 146 and light guide portion 147, and the light guide portion 147 may allow light to be emitted to the outside through the translucent portion 146. That is, the light source 145 has more freedom of placement since light from the light source 145 is directed along the light guide portion 147, which is formed not in a straight line but in a curve. That is, though not shown, the light guide portion 147 may be formed on one side, under the translucent portion 146, and light from the light source 145 provided in an area not overlapping the translucent portion 146 may be moved along the light guide portion 147 and emitted to the outside. In this case, the arrow shown in FIG. 9 indicates the path of movement of light from the light source 145 to the translucent portion 146.

Figure 10A:
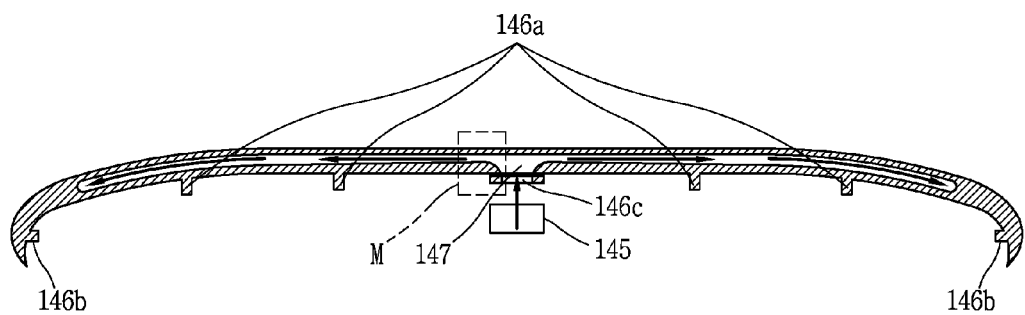
FIG. 10A is a cross-sectional view of a light-emitting portion according to an exemplary embodiment of the present invention.
Figure 10B:
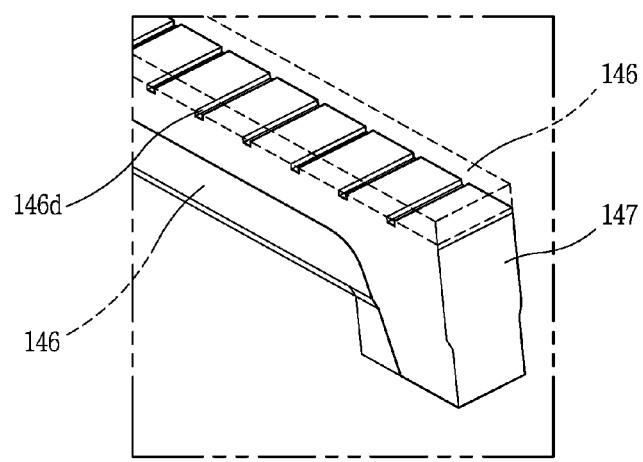
FIG. 10B is an enlarged perspective view of part M of FIG. 10A.

FIG. 10A is a cross-sectional view of a light-emitting portion according to an exemplary embodiment of the present invention. FIG. 10B is an enlarged perspective view of part M of FIG. 10A.

In this case, the translucent portion 146 and the light guide portion 147 may be manufactured by double injection, and only one light source 145 may cause the light guide portion 147 to diffuse light. Also, if the light guide portion 147 is a light guide plate, the light guide plate may have a variety of light-emitting patterns. That is, as shown in FIG. 10B, grooves 146d may be formed at regular intervals on the bottom surface of the light guide portion 147, and a variety of patterns may be formed by the spacing between the grooves 146*d*. Although FIG. 10B depicts that the grooves 146*d* are equally spaced, the spacing may become wider or narrower toward one end. Shading may be done by either gathering near the grooves 146*d* or giving off light.

As such, the light-emitting portion may function as a lighting indicator. That is, the light-emitting portion may inform the user of various types of events occurring on the mobile terminal 100, associated with message reception, call signal reception, missed calls, alarm, schedule reminder, data received from applications, and text/multimedia message transmission and reception. In this instance, the light-emitting portion may be implemented by an optical output module 154 (see FIG. 1A).

Although FIG. 10A illustrates that the light guide portion 147 is formed inside the translucent portion 146, the present invention is not necessarily limited thereto as long as the light guide portion 147 is positioned under the translucent portion 146 as shown in FIG. 10B. It can be seen that protrusions 146*a* and 146*b* are formed on the bottom surface of the translucent portion 146 to protrude downward and spaced at predetermined intervals to form a pattern. The protrusions 146*a* and 146*b* include bonding portions 146*a* and hook portions 146*b* that are used to bond the translucent portion 146 and the light guide portion 147 to the main body of the mobile terminal 100.

When the bonding portions 146*a* are compressed by the application of high-temperature heat, the bonding portions 146*a* enter the main body through a through-hole (not shown) formed in the case 103. Then, as the heat is removed from the bonding portions 146*a* in the main body, the bonding portions 146*a* become set and causes the translucent portion 146 to be bonded to the main body. The bonding portions 146*a* are provided midway along the translucent portion 146, and the hook portions 146*b* are provided on opposite ends of the translucent portion 146. The hook portions 146*b* may allow the translucent portion 146 to be fixed to both sides of the terminal's main body by high-temperature heat, like the bonding portions 146*a*. Alternatively, the hook portions 146*b* may allow the translucent portion 146 to be hooked onto the terminal's main body.

Although FIG. 10A illustrates that the light source 145 enters through a light entrance 146*c* positioned at the center of the translucent portion 146, the light source 145 does not necessarily need to be positioned that way, because the light guide portion 147 is provided, and the light source 145 may be positioned more to the left or right.

Figure 11:
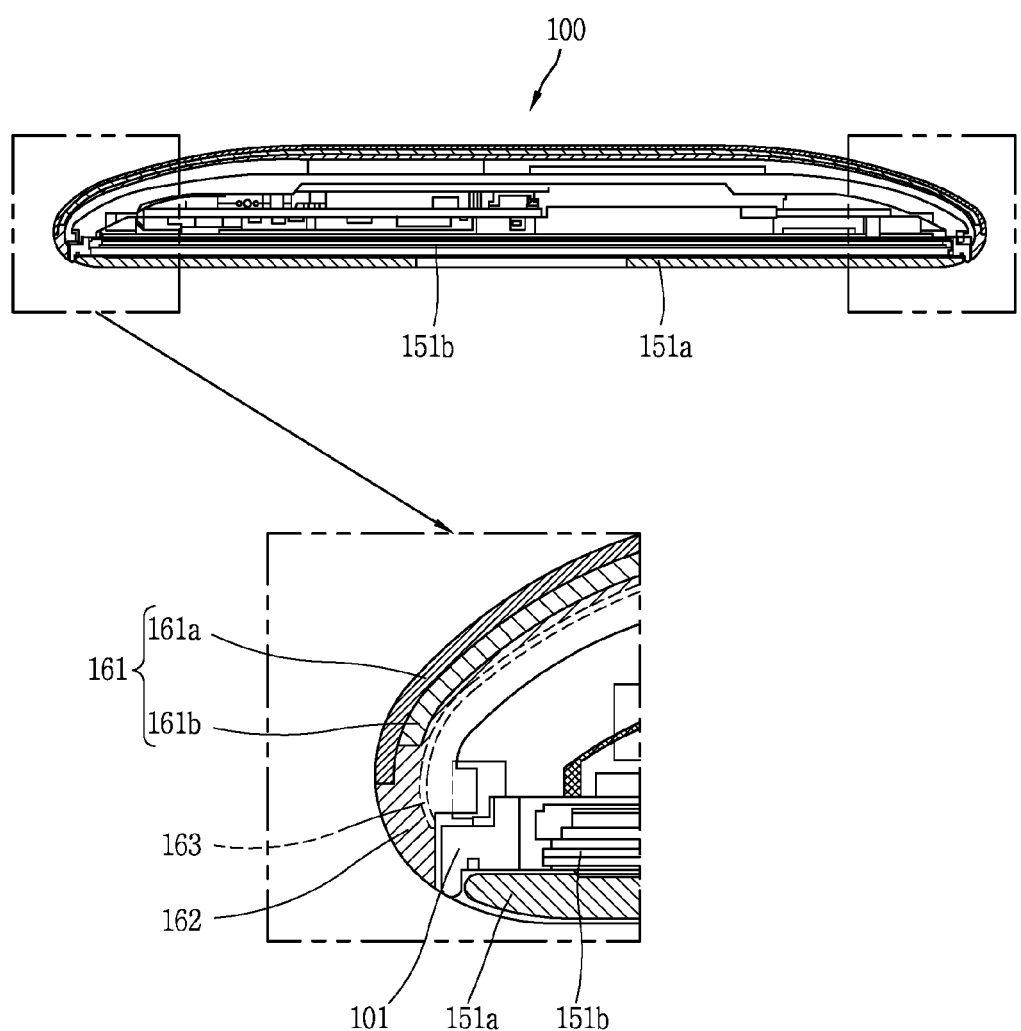
FIG. 11 is a cross-sectional view taken along BB of FIG. 1C.

FIG. 11 is a cross-sectional view taken along BB of FIG. 1C. If the second non-metal member 104*b* constitutes the light-emitting portion, the light-emitting portion may be a sub-display portion 161 that displays information. In other words, screen information generated during the operation of the mobile terminal 100 while light is emitted to the outside through the sub-display portion 161. The sub-display 161 may be associated with a display portion 151 positioned on the front side of the mobile terminal 100 or display another screen. Especially, the sub-display portion 161 may function as a display for informing the user of various types of events occurring on the mobile terminal 100, associated with message reception, call signal reception, missed calls, alarm, schedule reminder, data received from applications, and text/multimedia message transmission and reception.

The sub-display portion 161 is curved to the shape of the mobile terminal 100, and the sub-display portion 161 also is a component for displaying a screen, which has a typical display structure of displays. More specifically, the sub-display portion 161 includes a rear window 161*a* exposed to the backside, a rear display 161*b* positioned under the rear window 161*a*, and a support member 162 that fixes the rear window 161*a* and the rear display 161*b* to the main body.

The support member 162 may be the case 103 covering the back of the mobile terminal 10, or an extension of the case 103. The rear window 161*a* and the rear display 161*b* may be made of flexible material. That is, in an exemplary embodiment of the present invention, information processed by the mobile terminal may be displayed using a flexible display.

As shown in the figure, the sub-display portion 161 may be deformed by external forces. The deformation may be at least one among curving, bending, folding, twisting, and curling. Such a deformable display may be referred to as a 'flexible display portion'. Herein, the flexible display portion may include typical flexible displays, e-paper, and combinations thereof.

The flexible display portion is generally formed as a lightweight, non-fragile display, which still exhibits characteristics of a conventional flat panel display, but is instead fabricated on a thin, flexible substrate which can be curved, bent, folded, twisted, and curled like paper.

E-paper is a display technology that mimics the appearance of ordinary ink. Unlike conventional flat panel displays, e-paper displays reflect light. E-paper may use a twisting ball or electrophoretic capsules to load new data.

While the flexible display portion is not deformed (for example, an infinite radius of curvature; hereinafter, referred to as a first shape), a display region of the flexible display portion is a flat surface. While the flexible display portion is deformed from the first state by an external force (for example, a finite radius of curvature; hereinafter, referred to as a second shape), the display region may be a curved surface. As shown in the figure, data displayed in the second state may be visual data that it output on the curved surface. Such visual data is presented by independently controlling the light emission of unit pixels (sub-pixels) arranged in a matrix. A unit pixel refers to the smallest unit for representing a single color.

The flexible display portion may go from the first shape to a curved shape (for example, curved upward, downward, left, or right) In this instance, when an external force is applied to the flexible display portion, the flexible display portion may be deformed into a flat shape (or less curved shape) or a more curved shape.

Meanwhile, the flexible display portion may be implemented as a flexible touchscreen when combined with a touch sensor. When the flexible touchscreen is touched, the controller 180 (see FIG. 1A) may detect touch input when the flexible touchscreen is in the second shape as well as in the first shape.

The mobile terminal 100 according to this modification may have a deformation detection means for detecting deformation of the flexible display portion. The deformation detection means may be included in the sensing unit 140 (see FIG. 1A).

The deformation detection means may be provided in the flexible display portion or the case 103 to detect information associated with deformation of the flexible display portion. Herein, the information associated with deformation may include the deformation direction of the flexible display portion, the degree of deformation, the deformation position, the time of deformation, and the acceleration at which a deformed flexible display portion is restored. Besides, this information may include various information that can be detected because of curving of the flexible display portion.

Moreover, the controller 180 may display new data on the flexible display portion or generate a control signal for controlling a function of the mobile terminal 100, based on information associated with deformation of the flexible display portion detected by the deformation detection means.

The mobile terminal 100 according to an exemplary embodiment of the present invention may be accommodated in the case 103 housing the sub-display 161. Taking into account the characteristics of the flexible display portion, the case 103 may be configured to be deformed, along with deformation of the flexible display portion, by an external force.

It is not only external forces that can deform the shape of the flexible display portion. For example, the flexible display portion may be deformed from the first shape to the second shape by a command from the user or from an application.

If the support member 162 is made of a transparent material, light shielding tape is provided between the display and the main body. If the support member 162 is made of a transparent material, light generated from the sub-display 161 and light from the display provided on the front side of the mobile terminal 100 may interfere with each other. To prevent this, an exemplary embodiment of the present invention requires a light shielding member that shields light between the rear display 161b and the terminal's main body. However, the lighting shielding member is not needed if the support member 162 is made of a translucent material.

Referring again to FIG. 10A, opposite ends of the translucent portion 146 are curved toward the front side from the back of the mobile terminal 100, a pair of hook portions 146b are formed on the inside of the curved part, facing each other, and the front display 151 is seated on the pair of hooks 146b.

The translucent portion 146 includes bonding portions 146a that are formed between the pair of hook portions 146b and protrude toward the main body so that the second non-metal member 104b is fixed to the main body. The bonding portions 146a may be heat-sealing portions that are sealed with heat to bond the second non-metal member 104b to the main body.

FIGS. 12A to 12C are views for explaining a light-emitting portion, i.e., sub-display, according to an exemplary embodiment of the present invention. While FIG. 12A depicts that only simple information is displayed because of the small size of the sub-display 161, FIGS. 12B and 12C depict that, the larger the size of the sub-display 161 gets, the more information it displays. When a calling signal received, for example, FIG. 12A illustrates the display of only the name of the caller on the sub-display 161, FIG. 12B illustrates the display of the name of the caller and the time of occurrence of the event, and FIG. 12C illustrates the display of the name of the caller, the time of occurrence of the event, and image information about the caller.

In this case, the rear input portion 125 may be omitted as shown in FIG. 12C, in order to enlarge the display area of the sub-display 161.

The top side portion 103a, bottom side portion 103d, and first backside portion 103b work as antennas. This will be described below. The above-explained first to third non-metal members 104a, 104b, and 104c may be seen as working as slits in terms of antennas. The slits function to space antenna radiators like the top side portion 103a, bottom side portion 103d, and first backside portion 103b apart from one another and electrically insulate them.

Figure 3:
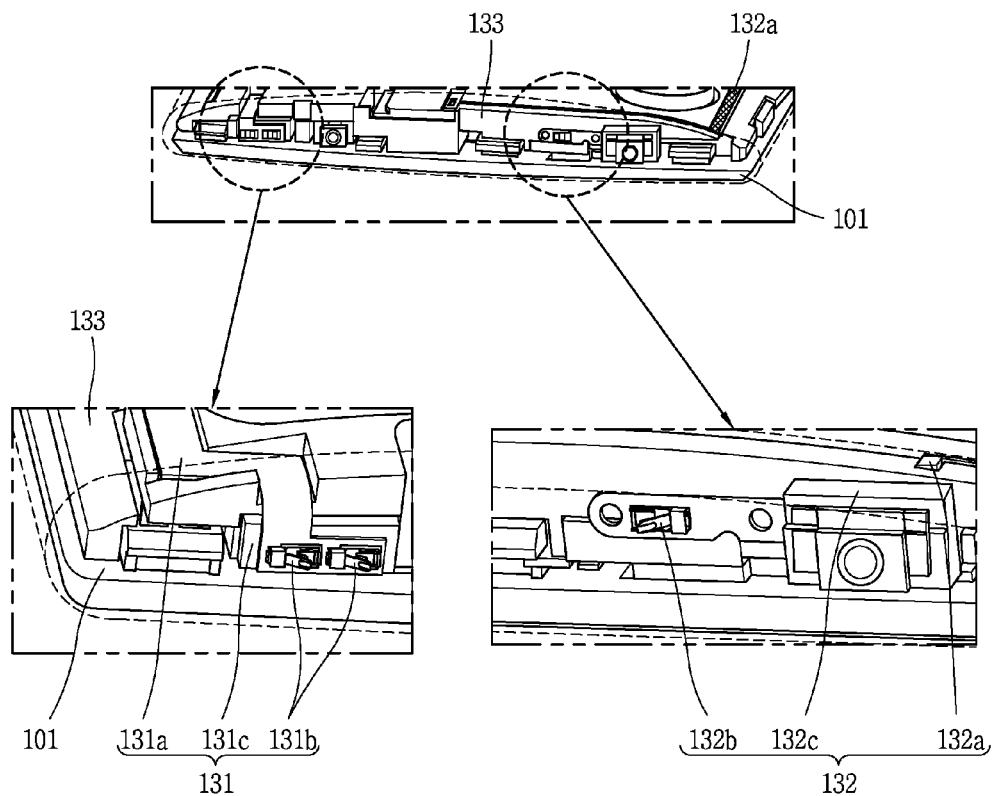
FIG. 3 is a partial perspective view of parts associated with an upper antenna device of a mobile terminal according to an exemplary embodiment of the present invention.
Figure 4:
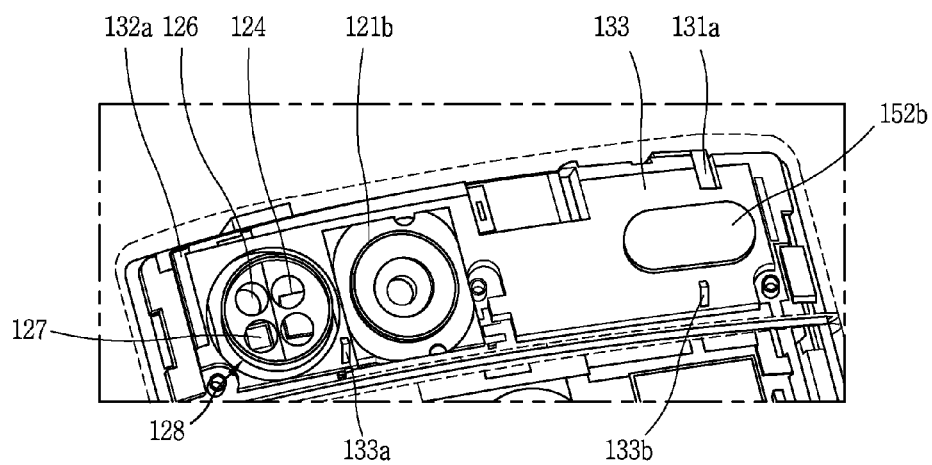
FIG. 4 is a partial perspective view of parts associated with a rear antenna device of a mobile terminal according to an exemplary embodiment of the present invention.
Figure 5:
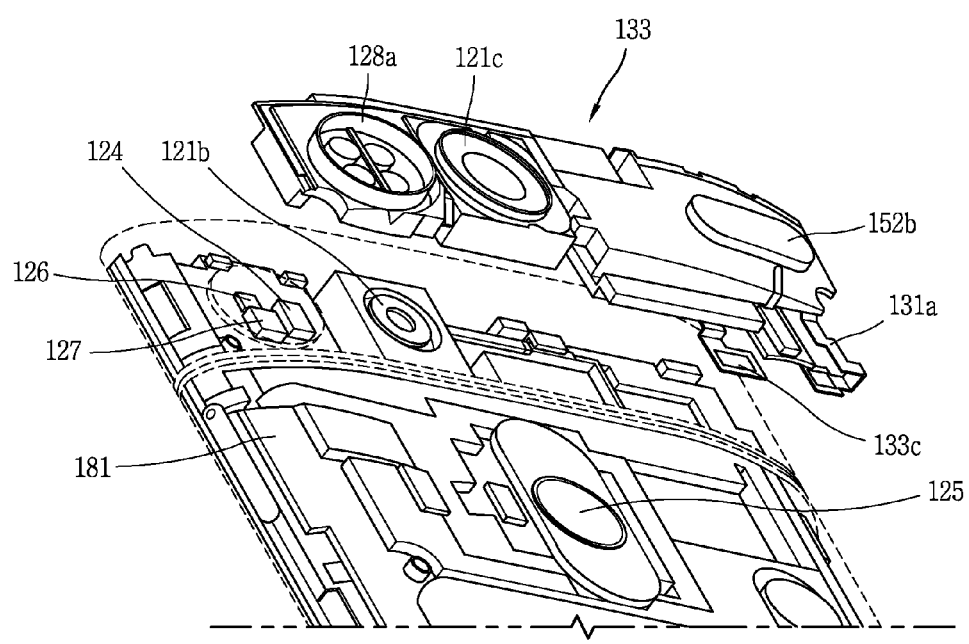
FIG. 5 is an exploded perspective view of FIG. 4.
Figure 6:
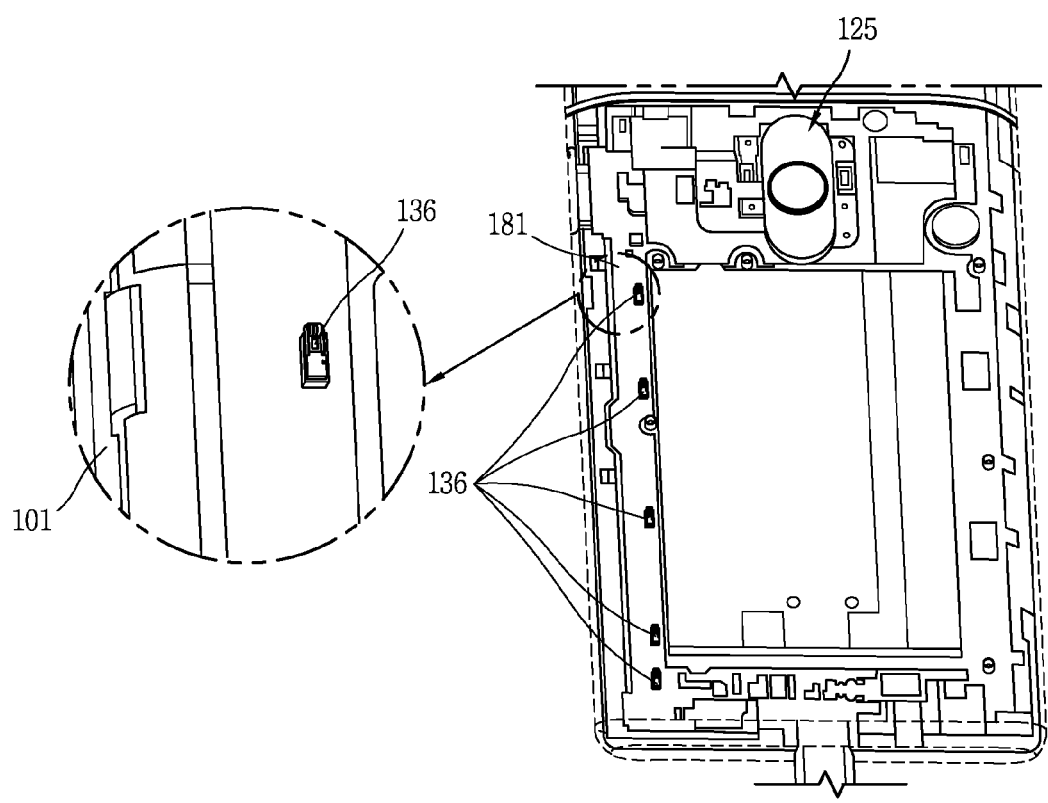
FIG. 6 is a perspective view of parts associated with a ground portion of a mobile terminal according to an exemplary embodiment of the present invention.
Figure 7:
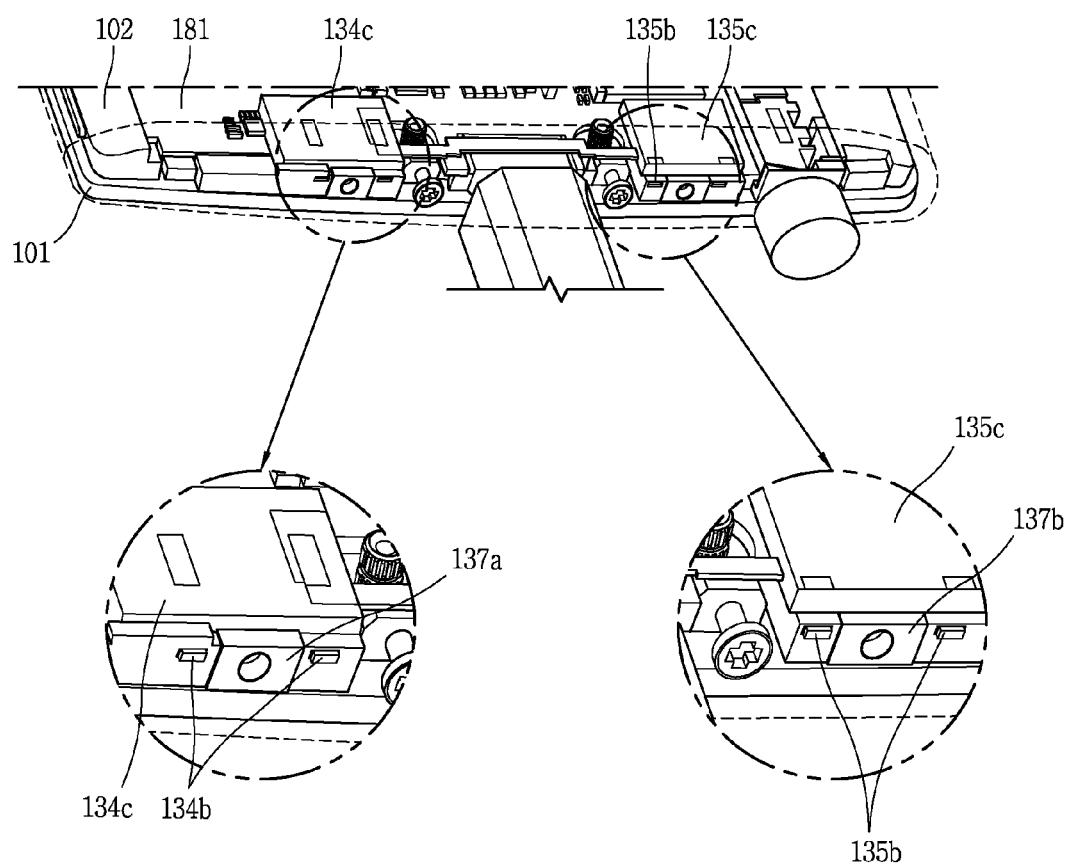
FIG. 7 is a partial perspective view of parts associated with a lower antenna device of a mobile terminal according to an exemplary embodiment of the present invention.
Figure 8:
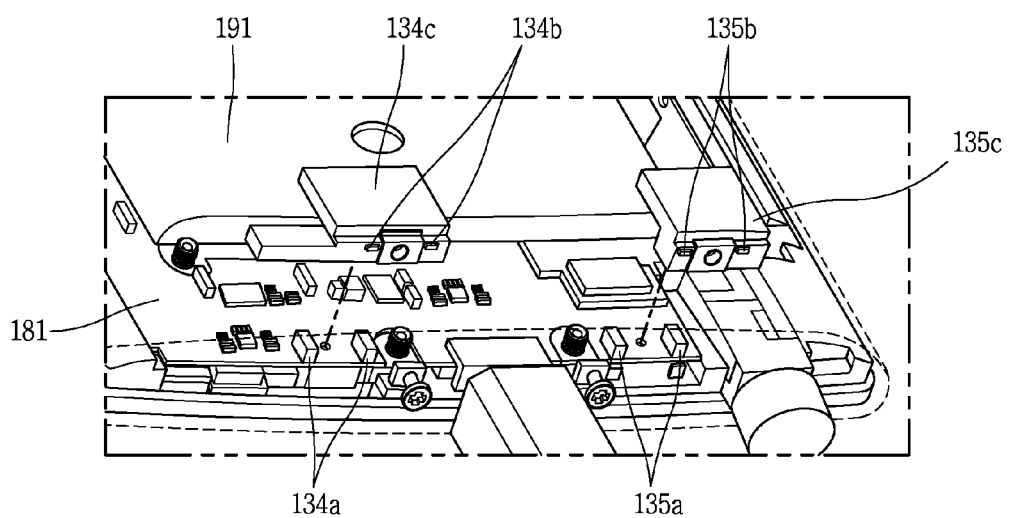
FIG. 8 is a partial exploded perspective view of FIG. 7.

First of all, FIG. 3 is a partial perspective view of parts associated with an upper antenna device formed on the top side of the mobile terminal 100 according to an exemplary embodiment of the present invention, FIG. 4 is a partial perspective view of parts associated with a rear antenna device formed in the rear upper part of the mobile terminal 100 according to an exemplary embodiment of the present invention, and FIG. 5 is an exploded perspective view of FIG. 4. In addition, FIG. 6 is a perspective view of parts associated with a ground portion formed in a rear middle part of the mobile terminal 100 according to an exemplary embodiment of the present invention, FIG. 7 is a partial perspective view of parts associated with a lower antenna device formed on the bottom of the mobile terminal 100 according to an exemplary embodiment of the present invention, and FIG. 8 is a partial exploded perspective view of FIG. 7.

Referring to FIG. 3, first and second flexible circuit boards 131a and 132a, connected to the printed circuit board 181 and spaced apart from each other, are provided on the top of the main body, and the first and second flexible circuit boards 131a and 132a include first and second feed connecting portions 131b and 132b electrically connected to the top side portion 103a to feed the top side portion 103a. This is for allowing the top side portion 103a to function as a radiator by supplying electric current to it. Also, the first and second flexible circuit boards 131a and 132a supply current and signals to the top side portion 103a provided on the top. The first and second feed connecting portions 131b and 132b are spaced apart from each other to supply power to either side of the top side portion 103a.

For example, the first feed connecting portion 131b may function as a feed connecting portion for using as a GPS antenna, and the second feed connecting portion 132b for using as a WiFi antenna. That is, the GPS antenna includes the printed circuit board 181, the first flexible circuit board 131a, and the first feed connecting portion 131b, and when power is supplied to the top side portion 103a through the printed circuit board 181, the first flexible circuit board 131a, and the first feed connecting portion 131b sequentially, the top side portion 103a functions as the GPS antenna as it radiates an electromagnetic wave. This is similar for the WiFi antenna. That is, when power is supplied to the top side portion 103a through the printed circuit board 181, the second flexible circuit board 132a, and the second feed connecting portion 132b sequentially, the top side portion 103a functions as the GPS antenna as it radiates an electromagnetic wave.

In this instance, the upper antenna device is equipped in a speaker assembly 133, the first feed connecting portion 131b is equipped with a first carrier 131c, and the second feed connecting portion 132b is equipped with a second carrier 132c. Also, the speaker assembly 133 is equipped with a speaker assembly circuit board 133c that electrically connects the speaker assembly 133 to the printed circuit board 181 to run the speaker assembly 133.

Feed connecting portions 131b, 132b, 133a, 133b, 134a and 135a according to an exemplary embodiment of the present invention can suffice, as long as two metal members are electrically connected together, and they may be C-clips, pogo pins, or EMI sheets, for example.

Also, referring to FIGS. 4 and 5, third feed connecting portions 133a and 133b are provided on the upper rear part of the main body, on the printed circuit board 181, which are electrically connected to the first backside portion 103b to feed the first backside portion 103b. The third feed connecting portions 133a and 133b allow the first backside portion 103b to work as a rear antenna device by supplying electric current to it. The rear antenna device may be a MIMO (multi-input multi-output) antenna, for example. The rear antenna device may be mounted on the speaker assembly 133, and FIG. 5 depicts a partial perspective view of the mobile terminal 100, which illustrates the speaker assembly 133 separately from the parts depicted in FIG. 4.

Referring to FIG. 5, a sensor portion 128 is provided on the rear upper side of the mobile terminal 100. The sensor portion 128 is accommodated in a sensor portion mount 128a protruding from the speaker assembly 133. The sensor portion 128 includes a flashlight 124, an RGB sensor 126, and a laser detection auto-focus (LDAF) system 127. The RGB sensor 126 performs functions such as white balance while the camera is operating. The laser detection auto-focus system 127 enables the camera to auto-focus more quickly using a laser, for taking photos.

The laser detection auto-focus system 127 includes a light-emitting portion that transmits laser light and a light receiving section. The laser detection auto-focus system 127 functions to measure distance or auto-focus for taking photos or video, by using the phase difference between an output signal and a received signal.

That is, conventional auto-focus (AF) systems require some time to cover the entire screen by focusing using image processing without a laser, whereas the laser detection auto-focus system 127 measures distance using phase difference by a laser and allows for fast processing in the focus range of 0 to 50 cm and conventional AF type processing beyond that focus range.

Referring to FIG. 6, it can be seen that a plurality of ground connecting portions 136 are spaced apart from one another on the printed circuit board 181 positioned on the back of the mobile terminal 100. The ground connecting portions 136 are electrically connected to the second backside portion 103c. Thus, the upper antenna, rear antenna, and lower antenna can operate at multiple frequency bands, respectively. That is, the electrical length of the antennas can be varied by changing the grounding position of the ground connecting portions 136, so that they have a resonant frequency.

FIG. 7 depicts the bottom of the mobile terminal 100 according to an exemplary embodiment of the present invention, which will be described with reference to FIG. 7.

In an exemplary embodiment of the present invention, a lower antenna device using the bottom side of the mobile terminal 100 as a radiator may be provided. The lower antenna device includes a pair of antenna devices similarly to the upper antenna device. That is, as shown in FIG. 7, an antenna device including a fourth feed connecting portion 134a, a fourth carrier 134c, and a fourth contact terminal 134b is positioned on the left side, and an antenna device including a fifth feed connecting portion 135a, a fifth carrier 135c, and a fifth contact terminal 135b is positioned on the right side.

The fourth feed connecting portion 134a is formed on the bottom of the main body, and connected to the printed circuit board 181. The same applies to the fifth feed connecting portion 135a. That is, the lower antenna device includes a fifth feed connecting portion 135a, a fifth carrier 135c, and a fifth contact terminal 135b, the fifth feed connecting portion 135a is positioned facing the fourth feed connecting portion 134a along the longitudinal center axis of the mobile terminal 100, and the fifth carrier 135c and the fifth contact terminal 135b are also positioned facing the fourth carrier 134c and the fourth contact terminal 134b, respectively.

The fourth and fifth carriers 134c and 135c are connected to the fourth and fifth feed connecting portions 134a and 135a, respectively, and have a metal pattern. Also, the fourth and fifth contact terminals 134b and 135b are formed at the fourth and fifth carriers 134c and 135c, respectively, to come into contact with the bottom side portion 103d. The lower antenna device is formed to come into full contact with the bottom side portion 103d, and operates over high and/or low frequency bands.

The carriers 134c and 135c each are divided into two or more parts so that the lower antenna device operates at multiple frequency bands. To this end, the antenna positioned on the left side of FIG. 7 operates over high-frequency bands, whereas the antenna positioned on the right side of FIG. 7 operates at low-frequency bands. Metal patterns formed on the fourth and fifth carriers 134c and 135c allow the lower antenna device to operate over various resonant frequency bands. To this end, the metal patterns may be formed in such a way that the user can operate the lower antenna device at a desired frequency.

An example of the metal patterns may include a meander pattern. Using this pattern, the manufacturer can adapt to different service providers. That is, the metal patterns allow the lower antenna device to operate over different frequency bands used by different countries. The same applies to the upper antenna device and the lower antenna device.

More specifically, each carrier may have an antenna tuning unit. The antenna tuner may be a matching module.

In addition, in an exemplary embodiment of the present invention, first and second audio input portions 137a and 137b are formed adjacent to where the lower antenna is formed. Therefore, the user voice recognition performance can be improved by the two audio input portions positioned on the bottom of the mobile terminal 100.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

What is claimed is:

1. A mobile terminal comprising:
    a main body having a top surface, a bottom surface, and a back surface; and
    a case surrounding the main body, the case including:
        a top portion covering the top surface of the main body;
        a first back portion positioned at an upper part of the back surface and covering at least a first portion of the back surface;
        a second back portion positioned below the first back portion and covering at least a second portion of the back surface; and
        a bottom side portion covering the bottom surface of the main body,
    wherein the top portion, first back portion, second back portion, and bottom side portion are made of a metal material,
    wherein the top portion, first back portion, second back portion, and bottom side portion are separated from one another by a non-metal member,
    wherein the non-metal member has a light-emitting portion that gives off light,
    wherein the light-emitting portion comprises:
        a translucent portion; and
        a light source provided below the translucent portion, wherein opposite ends of the translucent portion are curved toward a front of the mobile terminal from a back of the mobile terminal to provide a curved part, the translucent portion including a pair of hook portions formed on an inside of the curved part, the pair of hook portions extending towards each other, and wherein a front display is seated on the pair of hooks.

2. The mobile terminal of claim 1, wherein the non-metal member comprises:
a first non-metal member that separates the top portion and the first back portion;
a second non-metal member that separates the first back portion and the second back portion; and
a third non-metal member that separates the second back portion and the bottom side portion.

3. The mobile terminal of claim 2, wherein the light-emitting portion further comprises a light guide portion provided below the translucent portion and made of a transparent material that transmits light from the light source.

4. The mobile terminal of claim 3, wherein grooves are formed at regular intervals on a bottom surface of the light guide portion, and a variety of patterns are formed by the spacing between the grooves.

5. The mobile terminal of claim 2, wherein the light-emitting portion is a sub-display portion that displays information, the sub-display portion including:
a rear window;
a rear display; and
a support member that fixes the rear window and the rear display to the main body.

6. The mobile terminal of claim 5, wherein the sub-display portion is curved to correspond to a shape of the mobile terminal.

7. The mobile terminal of claim 5, wherein light shielding tape is provided between the rear display and the main body.

8. The mobile terminal of claim 1, wherein the translucent portion includes bonding portions arranged between the pair of hook portions, and
wherein the bonding portions protrude toward the main body such that the second non-metal member is fixed to the main body.

9. The mobile terminal of claim 2, wherein the top portion, first back portion, and bottom side portion are connected to a printed circuit board such that the top portion provides a first antenna radiator, the first back portion provides a second antenna radiator, and the bottom side portion provides a third antenna radiator, and
wherein the second back portion is electrically connected to the printed circuit board to provide a ground portion.

10. The mobile terminal of claim 9, further comprising first and second flexible circuit boards connected to the printed circuit board and spaced apart from each other, the first and second flexible circuit boards being provided near the top surface of the main body,
wherein the first and second flexible circuit boards include respective first and second feed connecting portions electrically connected to the top portion to feed the top portion.

11. The mobile terminal of claim 9, further comprising third feed connecting portions on the printed circuit board at the upper part of the back surface, the third feed connecting portions being electrically connected to the first back portion to feed the first back portion.

12. The mobile terminal of claim 9, further comprising:
a fourth feed connecting portion on the printed circuit board on one side of the bottom surface of the main body;
a fourth carrier connected to the fourth feed connecting portion and having a metal pattern; and
a fourth contact terminal formed at the fourth carrier and contacting the bottom side portion.

13. The mobile terminal of claim 12, further comprising:
a fifth feed connecting portion on the printed circuit board provided on another side of the bottom surface of the main body;
a fifth carrier connected to the fifth feed connecting portion and having a metal pattern; and
a fifth contact terminal formed at the fifth carrier and contacting the bottom side portion.

14. The mobile terminal of claim 13, wherein the fourth carrier and the fifth carrier each includes an audio input portion.

15. The mobile terminal of claim 9, wherein the first non-metal member defines a slit between the first antenna radiator and the second antenna radiator,
wherein the second non-metal member defines a slit between the second antenna radiator and the ground, and
wherein the third non-metal member defines a slit between the ground and the third antenna radiator.

16. The mobile terminal of claim 1, wherein a thickness of the mobile terminal at the first back portion is larger than a thickness of the mobile terminal at the second back portion.

17. The mobile terminal of claim 1, wherein the light-emitting portion is configured to provide an indicator representative of at least one of a message reception, a call signal reception, a missed call, an alarm, a schedule reminder, data received from an application, or text/multimedia message transmission and reception.

18. The mobile terminal of claim 1, wherein the main body further includes a front surface, the front display being located at the front surface, and the back surface being opposite the front surface.

* * * * *